United States Patent [19]

Friedman

[11] 4,276,561
[45] Jun. 30, 1981

[54] EARTH PHOTO GLOBE

[76] Inventor: Jon Friedman, 312 Prince St., Freeport, N.Y. 11520

[21] Appl. No.: 27,937

[22] Filed: Apr. 6, 1979

[51] Int. Cl.³ .................... H04N 1/04; G09B 27/08
[52] U.S. Cl. .................................. 358/78; 358/292; 434/131
[58] Field of Search ............... 358/75, 78, 256, 292, 358/302, 388, 56, 230, 60–63, 231–236, 109; 35/46 R, 46 A, 47

[56] References Cited

U.S. PATENT DOCUMENTS

| 3,406,312 | 10/1968 | Redman | 35/46 R |
| 3,992,718 | 11/1976 | Driskell | 358/61 |

*Primary Examiner*—John C. Martin
*Attorney, Agent, or Firm*—Spensley, Horn, Jubas & Lubitz

[57] ABSTRACT

This Earth Photo Globe is characterized in that LANDSAT or other remote sensing geographical indicia is reproduced on the globe sphere with a definition smaller than that resolvable by the unaided human eye. An optical magnifier is mounted above the globe sphere to enable resolution of the full globe definition. A "cloud cover" spherical overlay may surround the sphere and contain a representation of the earth's cloud cover. The magnifier may be supported by this overlay.

Various systems are disclosed for making the Earth Photo Globe. One uses a laser beam that is raster scanned across a photosensitized sphere, and is modulated by LANDSAT pixel data. In another system the LANDSAT data is used to prepare a set of photographic negative images each covering a section of the globe, and each containing alignment and positioning information. These images are projected onto a photosensitized sphere to make the globe.

Several globe-illumination systems are also disclosed, including a diurnal interior lighting assembly and a surface lighting scheme for displaying geopolitical data.

10 Claims, 21 Drawing Figures

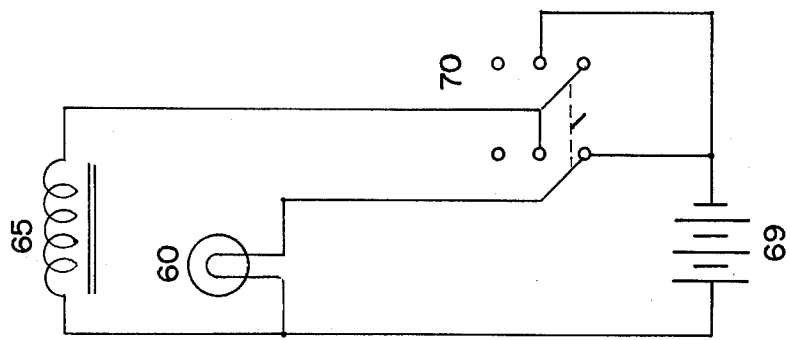
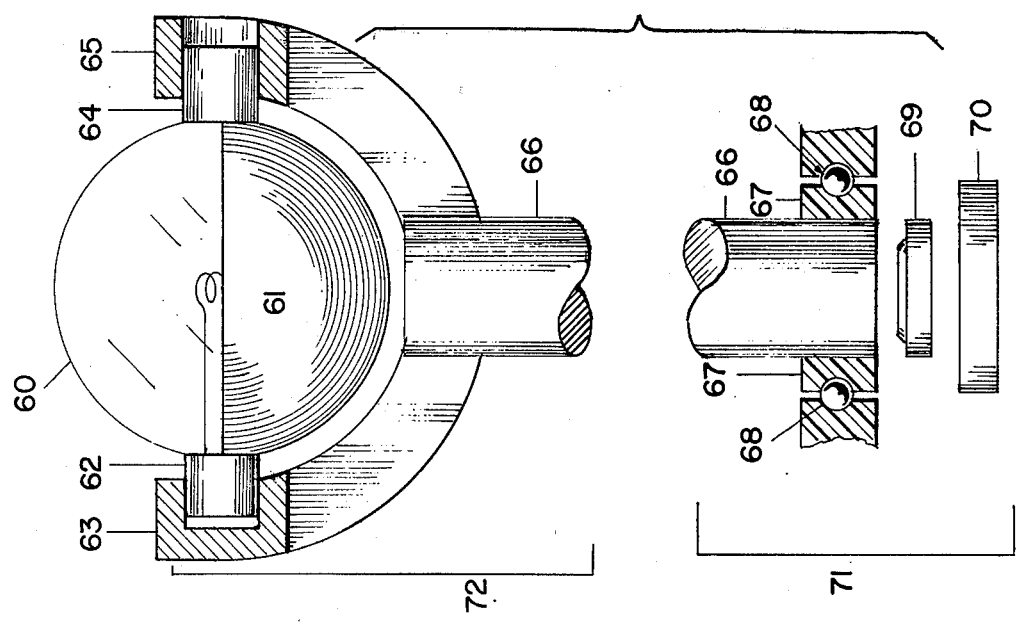
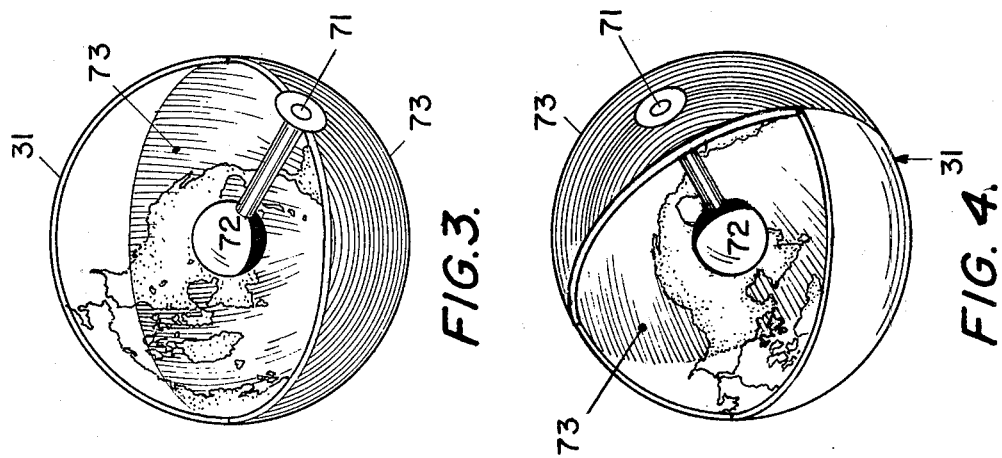

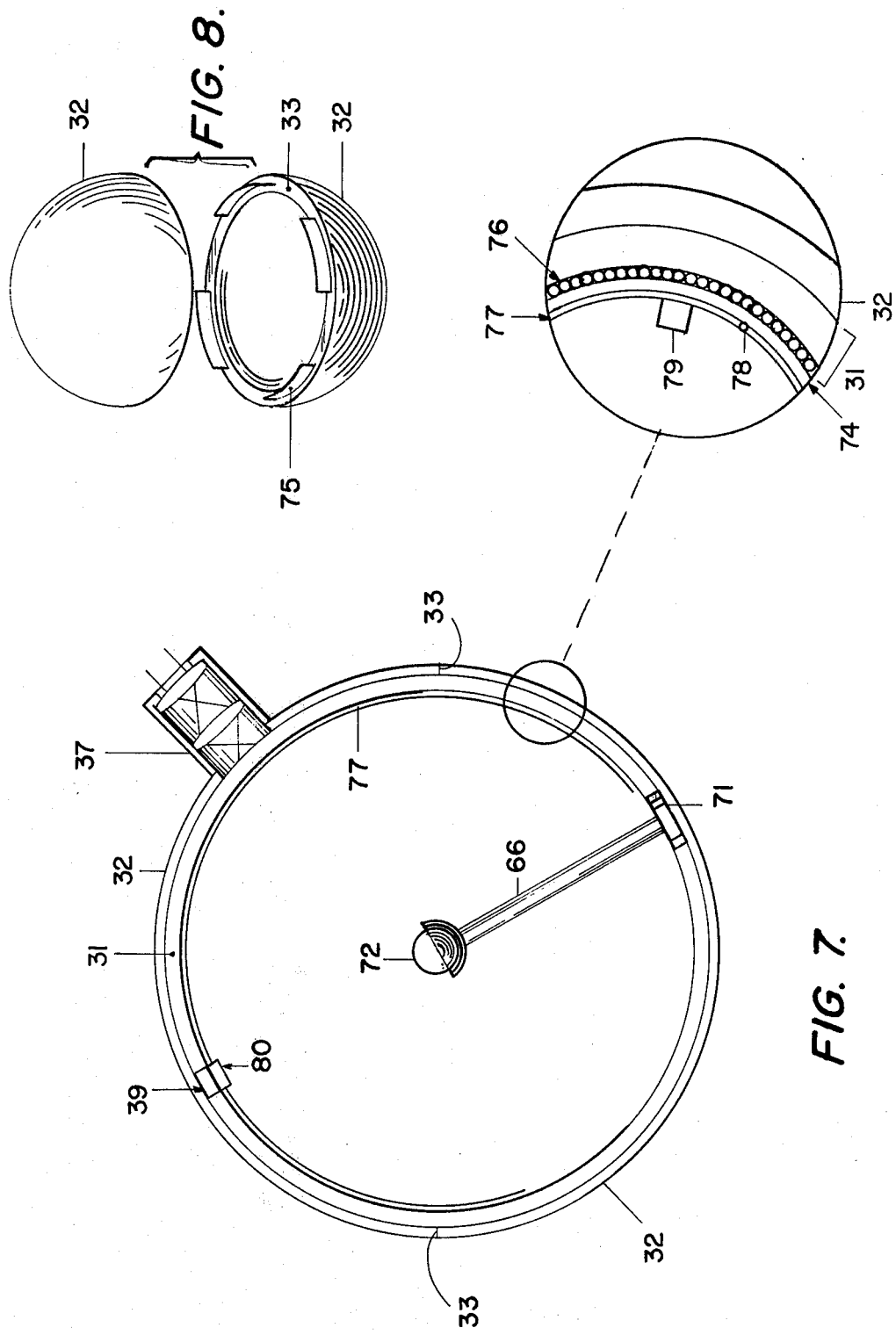

EARTH PHOTO GLOBE

BACKGROUND OF THE INVENTION

1. Field of the Invention

Design for a photographic globe of Earth.

This invention, an Earth Photo Globe, consists of the parts of a globe, a method for the manufacture and preparation of the global photographic emulsion sphere, and several methods for putting appropriate data onto the surface of the sphere with appropriate accuracy.

2. Description of the Prior Art

Existing globes and their limitations.

The current and up until now universal method for making globes of the Earth and other heavenly bodies has been to produce a drawing on a flat surface which is based upon the relevant cartographic information embodied in maps of local surveys. These maps are combined into a larger "global" mapping according to one of several projections, whose geometry describes the appropriate cuts to the flat drawing, so that this drawing may be approximately folded and stretched to fit the spherical surface of the three-dimensional earth model. The National Geographic Society's physical globe using a meridial gore construction is an example of such practice.

The limitations of this method are:

1. Cartographic globes are drawn and as such demand impossible and in some cases (such as the wastes of the Sahara desert) unattainable attention to detail in the process of producing an image of the entire planet. This leads to maps of large areas which must include low resolution and gross inaccuracy somewhere on the surface.

2. The general practice is to make such a drawing on a flat surface and then cut gores to fit around the sphere, gluing and fitting through some mechanical means. The difficulties of aligning these gores simultaneously tends to produce inaccuracies of register at their edges. Two sections will not align up and render any other attempt at high accuracy meaningless.

3. The painstaking process of assembling separate drawings to produce a single image which depends upon the complex integration of large amounts of information means that a globe is difficult to update. To change political boundaries between two countries, for instance, requires that a completely new edition of the globe be produced.

4. Cartographic globes are difficult to reproduce at varying scales, because the mechanics of gluing and fitting require different jigs etc. at different globe sizes.

5. Cartographic globes cannot render multi-spectral information about the Earth, nor can they render continuous data. For instance, to indicate relief contour, lines may be drawn, but there is always a remaining gradient between the contour lines that is impossible to render without obliterating the surface completely.

With the advent of LANDSAT survey and data, the continuation of cartography as the sole means of producing a globe of Earth appears to be an exceptional anachronism. LANDSAT is a NASA high altitude satellite survey of the surface of the earth. Multi-spectral scan using a Vidicon camera provides a continuous output of digital data that covers most of the land of the earth once every nine days. This data is collected at the EROS data center in Sioux Falls, South Dakota and elsewhere, and is in the public domain. The ground resolution of LANDSAT is a picture image or pixel of 79×57 m. An individual LANDSAT image surveys an area 100×100 nautical miles (=185 km×185 km). This means that once every nine days the surface of the earth is encoded into some 36,000,000,000 new bits of information. LANDSAT data is available as digital output (tape), video display (using CRT), and as individually printed photographs. Elaborate and expensive procedures have produced mosaics of individual LANDSAT images to make images of larger areas. For instance, NASA, GE, and National Geographic Society combined to produce in 1976 Space Portrait U.S.A., a photomosaic of some 562 individual LANDSAT images.

Up until this point a globe of LANDSAT images has not been attempted because of the very great difficulties the large amounts of data and requirements of very high resolution present. To make a globe of LANDSAT images (or any other photographic input), one must overcome the following problems:

1. High resolution. To produce a globe on the scale of the current product (diameter of one to two feet), each pixel of LANDSAT data must be represented with an accuracy on the order of 0.0001 inch. This requires exceptional care in mechanical, chemical, optical, and data systems.

2. Precision of register. Once sufficiently accurate data is available to be placed on the globe, it must be placed with at least an equal degree of care. This means that reduced LANDSAT images must align over the entire surface of the globe with again a tolerance of 0.0001 inch.

3. Overlap. Because the original LANDSAT tracking overlaps images from orbit to orbit, and because these neighboring images differ according to time of day, weather conditions etc., where the images overlap there is a certain unwanted visual "noise". Current mosaicing techniques demand a great deal of skill, time and care primarily because of this problem. Any attempt at solving this problem for the entire globe, where thousands of overlap problems will be encountered, must utilize some new and automatic method. Again, the accuracy of this method must also be on the order of 0.0001 inch.

4. Since each LANDSAT image is composed of roughly 6,000,000 pixels or databits, any method of accurately making a globe with this goal of accuracy must utilize some large scale data storage and incorporate it into the printing method.

5. Since so much data is required, the methods for producing the globe must be at very high speeds.

My objective is to produce a very high resolution globe of the earth using the most accurate available photographic data. The ultimate goal is to produce this at a scale of comprehensiveness and precision so that every individual will be able to see both his entire planet (only one hemisphere is visible on a sphere at any one time) and his house (with suitable magnification). Further, I intend to produce this so that the product is of high quality and competitive in price with existing products in the field.

After surveying the current state of the art, I have concluded that this ultimate objective is not attainable at the present time. In face, in several related fields, it appears that the present limits to data input, resolution of image, and resolution and mechanical registration in production are all too gross, perhaps by an order of magnitude. This still will produce a product of far greater accuracy than anything currently attainable. The globe thus produced will be able to carry each individual pixel of LANDSAT data, which is of course already too gross to distinguish individual buildings.

Whatever the limitation of technology for scale, the method will remain the same when certain technical problems are solved and higher resolutions are available. Using a rule of thumb common in the microelectronics industry, which is concerned with many of the problems relating to this design, one may expect that the appropriate resolution will double every year or so. Thus such resolution may be available soon.

SUMMARY OF THE INVENTION

The techniques outlined herein make possible a number of improvement over existing globes. My globe will be able to:

1. indicate to a high degree of accuracy and comprehensiveness ocean depths as well as land data;
2. provide a removable underlay or overlay that can indicate political deliniations in conjunction with the photographic data. Or, according to the user's desires, the photographic globe alone may be studied;
3. change individual sectors frequently, allowing updated editions as often as desired;
4. provide accurate modelings of day-night variations, seasonal changes in sunrise-sunset events, and the clouds, which are an integral part of the earth but up to now have been ignored in globes because of the problems of obscuring important information below. By making a removable cloud layer, this problem has been overcome;
5. be manufactured in different sizes very simply, with just a simple adjustment in position and optics.

The method herein described can use LANDSAT, or any other digitized, as well as photographic input to produce the globe.

A major problem has been how to get such information into a form that can be reproduced optically onto a visual form on a globe. This requires converting the new data for each (LANDSAT) pixel into an analogous color dot on the surface of the globe.

The best prior art includes Mead Technology Laboratories "Digital Graphics Generator" and "Digital Laser Printer" as well as DICOMED's CRT Film Recorder. The DLP uses laser printing onto a light-sensitive emulsion at very high speeds. Also IBM 3000. The CRT Film Recorder directly projects onto photographic film LANDSAT and other images pixel by pixel in up to a 4096×4096 array. This process, while very accurate, is relatively slow. In general, these techniques have been applied to producing cylindrical and flat images or data terminal displays. The special requirements of a globe need geometrical translations to adapt these processes to a spherical surface. The method(s) herein described to do this are part of this invention.

In addition, the relative values and drawbacks of these various high-speed digital systems have led to developing a method which combines the strengths and eliminates the problems associated with using each of them separately.

BRIEF DESCRIPTION OF THE DRAWINGS

FIGS. 3 and 4 are perspective views of the earth photo globe of FIG. 1 cut away to show a diurnal illumination system in accordance with another aspect of the present invention.

FIG. 5 is a side elevation view of another diurnal illumination system for the inventive earth photo globe.

FIG. 6 is an electrical schematic diagram for the lighting system of FIG. 5.

FIG. 7 is a transverse sectional view of another embodiment of the inventive earth photo globe, and includes an enlargement of a section of that globe illustrating a scheme for illuminated display of geopolitical information.

FIG. 8 is a perspective view showing one manner of construction of a cloud cover overlay for the inventive earth photo globe.

DESCRIPTION OF THE PREFERRED EMBODIMENTS

The following detailed description is of the best presently contemplated modes of carrying out the invention. This description is not to be taken in a limiting sense, but is made merely for the purpose of illustrating the general principles of the invention since the scope of the invention best is defined by the appended claims.

Operational characteristics attributed to forms of the invention first described also shall be attributed to forms later described, unless such characteristics obviously are inapplicable or unless specific exception is made.

Figure 1:
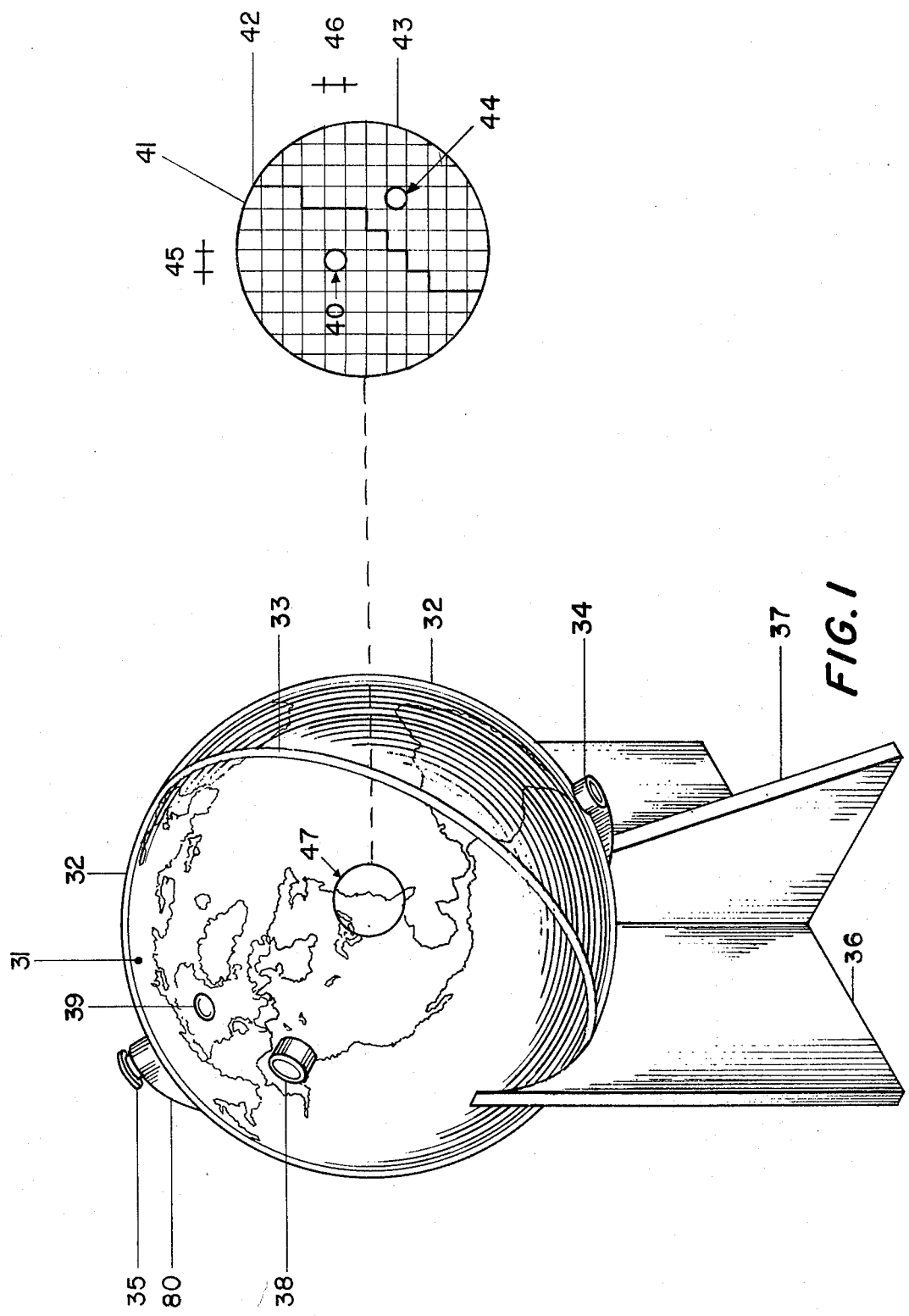
FIG. 1 is a perspective view of the inventive earth photo globe.

FIG. 1 shows the earth photo globe (31) covered by two cloud layer overlay hemispheres (32) that interlock at the cloud equator (33). The globe, with or without the cloud layer overlay (hemisphere (32)) is supported by a globe support arm (80) which features an adjustable mount (35) which may be tightened if the globe is mounted without the optional cloud layer hemisphere (32). This allows the globe to rotate around the actual north-south polar axis, or around any other two points which are 180° apart. At the other end of the globe support arm (80) is a fixed mount (34). One of the cloud layer hemispheres (32) will include an integral optical magnification assembly (38) to permit more detailed inspection of the surface of the globe. The support arm (34) sits on a toothed interface with support (37) which interlocks with bracing support (36) to provide a firm stand for the entire globe and cloud assembly. There are control assemblies embedded at each of the poles on the globe. The control assembly at the north pole (39), when switched on, can indicate political information. The control assembly at the south pole (71) (not shown in FIG. 1 but indicated in FIG. 7) when switched on indicates information about seasonal and diurnal lighting conditions on the earth.

A detailed portion of the globe surface is shown at (47) and again in enlargement. This surface is composed of an array of dots corresponding to land (40) or water (44) conditions on the earth's surface. A coastline is thus indicated at (42). Each dot signifies a representative number of picture elements hereinafter referred to as pixels, of LANDSAT or other remmote sensing data. The land grid (41) and sea grid (43) indicate the degree of precision which may be obtained, and places where dots may be printed. Actual dots are indicated by land dot (40) and sea dot (44). The dimensions of the printed dot's working diameter are indicated (45) and (46) longitudinal and latitudinal. No consideration of dot overlap is herein made.

Figure 2:
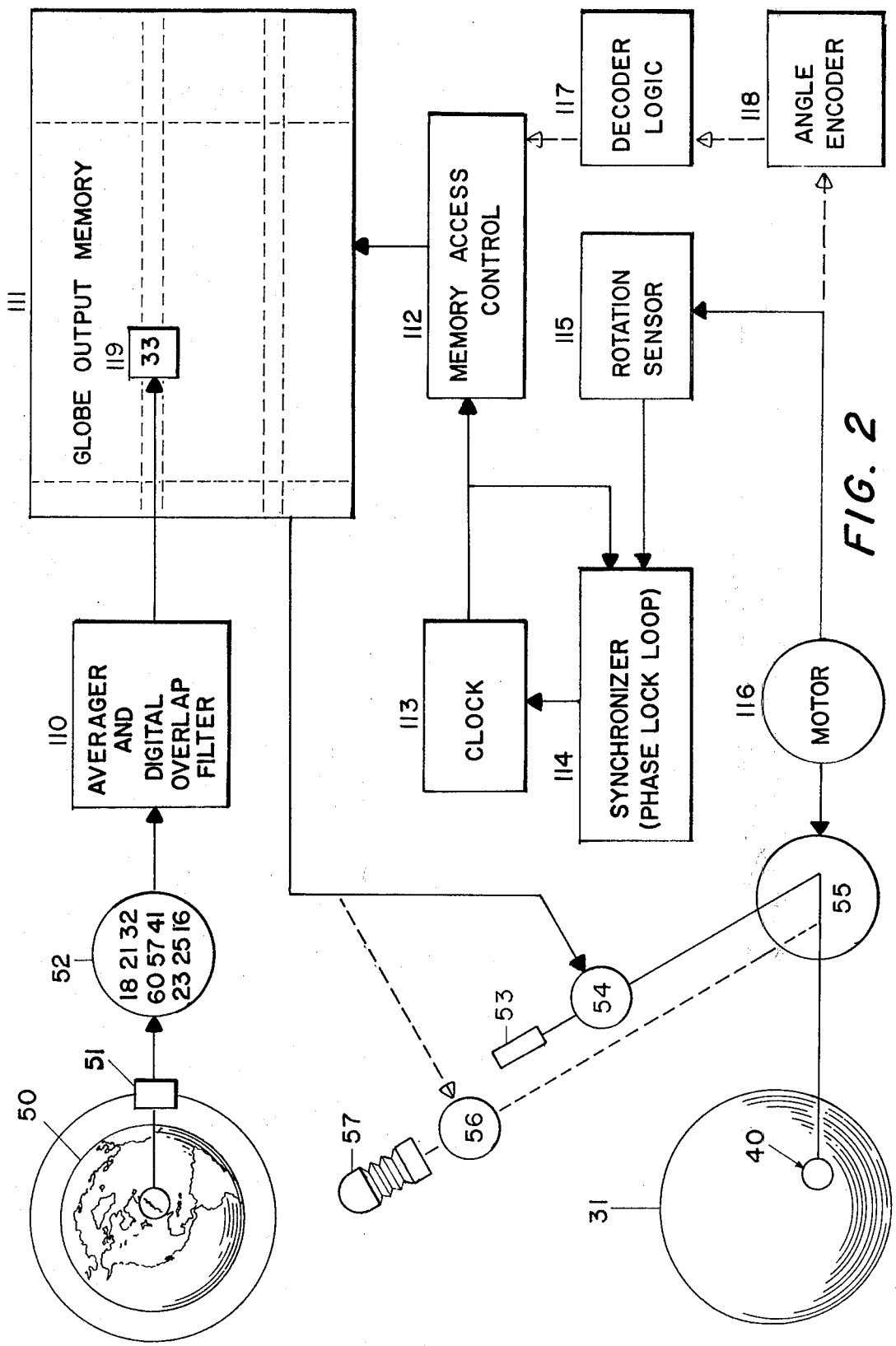
FIG. 2 is a schematic diagram illustrating one inventive method of preparing the earth photo globe of FIG. 1.

FIG. 2 shows the architecture of the entire system required for producing the Earth Photo Globe, including certain unique features of both software and hardware. A camera aboard an orbiting satellite (51) orbits the earth (50) and relays remotely sensed data back to earth receiving stations in the form of digital values for each area covered and distinguished (52). This is the form of data aquisition employed by the LANDSAT satellite systems. When two or more remotely sensed images include the same locations on earth, where a single location on earth (hereinafter referred to as address) is represented by a pixel from each of several remotely sensed images, an averager and digital overlap filter program algorithm (110) will find the best average value for that pixel that will represent the shared location. When each dot (40) of the ultimate globe (31) is to represent more than one remotely sensed pixel value, then the averager and digital overlap filter (110) will find the average value for these pixels, and enter them into the computer memory (111) as a representative value (119) with a coded representative address. The globe output memory (111) then feeds these values in an orderly way to the appropriate globe imaging system, which may be a plurality of acousto-optical modulators (54) for a plurality of lasers (53) in a laser printing system, or a film-negative drive system (56) in a photographic printing system (57). The precise light value at any particular instant to be printed (119) is coordinated with its location on the globe (31) through a memory access control (112) which reads from the proper globe memory (111) address the pixel value (119) to be printed. The memory access control (44) tells the globe output memory (111) when to issue the value to the modulators (54) or drive system (56) by reading a rotation sensor (115) which determines the location of the printing mirror (55) and the printing mirror drive motor (116). The clock (113) and synchronizer (114) internal to the computer system insure that value to be printed, its position on the globe, and location of the printing mirror will all be synchronized. Alternatively, an angle encoder (118) and decoder logic (117) may instruct the memory access control which address to select according to the angle of the printing mirror (55).

FIG. 3 shows a cutaway view of the Earth Photo Globe which shows the interior lighting element (72) in the free-pivot position. In this position, the translucent portion of the bulb (60) will always tend to face up while the slightly heavier opaque portion of the bulb (61) will tend to face downwards. The interior lighting element (72) is attached to a shaft (66) which is attached to the lighting control assembly (71). The lighting control assembly (71) can rotate on bearings (68) and thus provide for a great number of positions for illumination of the earth's surface. The shadow thus produced (73) indicates the night side of the earth.

FIG. 4 is also a cutaway view of the Earth Photo Globe which shows the interior lighting element (72) in the fixed-pivot position. In this case, the double-pole-three position pushbutton (DP 3P PB) switch (70) activates both the light bulb (60, 61, 72) and the solenoid (65) which moves the bar (64) and the attached bulb (60) into a locked position. A sliding contact (62) still keeps the electrical current flowing by maintaining contact with the pivot mount (63). Thus with the aid of gravity, a variety of lighting and night-day positions are obtainable with this globe.

FIG. 5 shows the major elements of the globe's interior illuminating system. The lighting control assembly (71) includes shaft (66), shaft supports (67) and bearings (68) which allow the interior lighting element (72) to rotate about the earth's axis in accurate fashion. The switch (70) is a push-button type and completes the circuit by closing contact with the replaceable battery (69).

FIG. 6 is a circuit diagram for the interior lighting element (72) and lighting control assembly (71). The circuit is designed so that the switch (70) may be in the off position, or in position to activate the light (60) only, or be in position to activate both light (60) and solenoid (65). The replaceable battery (69) completes the circuit.

FIG. 7 shows a cross section of the Earth Photo Globe. The enlargement shows certain elements in detail. The photographic emulsion layer (76) is shown as individually developed pixel dots, a schematic representation of the quantized nature of the globe surface image. This layer (76) is composed of individual dots (40, 44) and is deposited and developed on the globe structure shell (31) which is composed of a rigid translucent material like Lexan. FIG. 8 shows the cloud hemispheres (32) composed of a semi-rigid material which has an image of the clouds produced upon it. The two hemispheres interlock at their equator through a twist-slot and tab arrangement (75).

Figure 14:
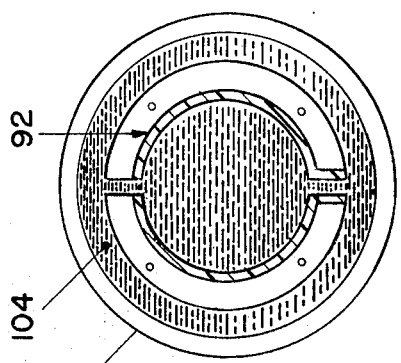
FIG. 14 is an illustration of the manner in which an exposed emulsion surface on a globe sphere may be placed in a developer bath.

A transparent protective coating (74) is affixed to the emulsion layer (76) in the photographic developing process (see FIG. 14). A side elevation (77) and cross-section (78) of the political information circuitry show how the north pole control assembly (39) is connected with dispersed political information elements (79) which might typically be sub-miniature light emitting diodes or liquid crystal elements and might typically represent cities of 100,000 or more population, (approximately 1500 at the time of this writing). Thus it would be possible on the Earth Photo Globe to represent the night illumination of earth's metropolises and show all cities which experience dusk at the same time. Similarly, political information circuitry (77, 78) and information elements (79) might be used to represent political boundaries and other pertinent geographic data. When this circuitry is made to include complex IC microprocessors (80), entire gazettes of geographic data may be displayed on the Earth Photo Globe.

Figure 9:
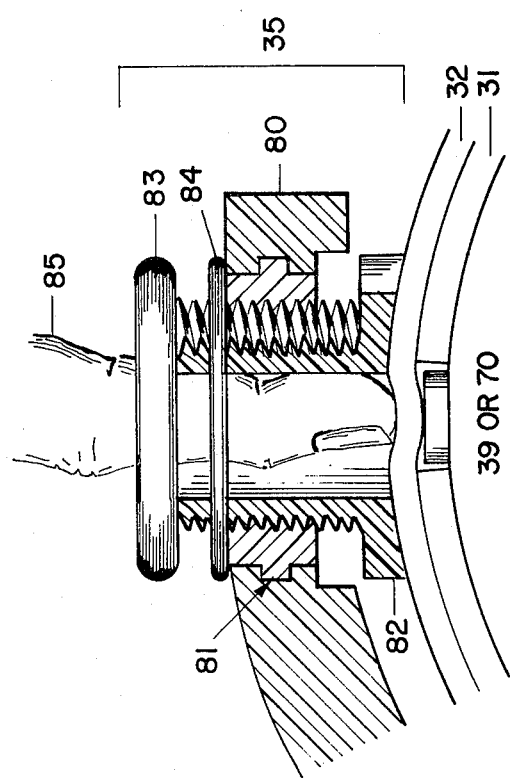
FIG. 9 is a fragmentary transverse sectional view of a support system for the inventive earth photo globe, particularly useful with embodiments employing a cloud cover overlay.

FIG. 9 shows in detail the features of the adjustable mount (35). The globe support arm (80) is grooved to permit the insertion of a swivel mount (81) which in turn has a threaded interior wall that permits the threaded mounting bracket (82), shown in partial cutaway view, to be tightened by the grip (83) and lock nut (84) and hold any of several positions to enable a positive contact with the globe alone (31) or the globe with cloud layer overlay (32). The grip (83) is integral with the threaded mounting bracket (82), and is fashioned to permit ease of operation. The threaded mounting bracket (82) is slightly concave to permit a positive contact with the globe sphere, and is hollow to permit the insertion of a finger (85) to operate the north (39) or south (70) pole control assembly, should either of these be located under the adjustable mount (35).

Figure 10:
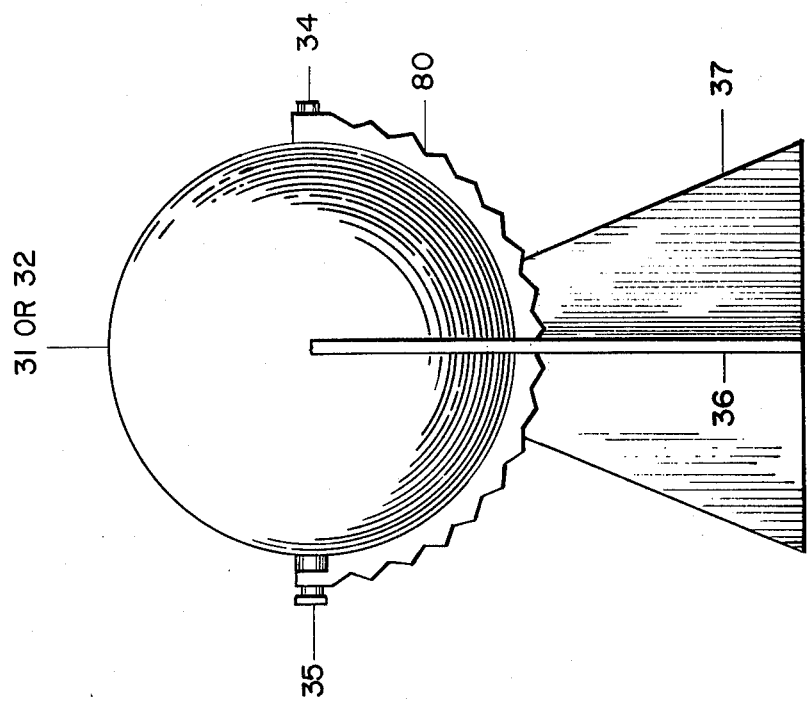
FIG. 10 is a side view of the inventive photo globe together with a support system therefor.

FIG. 10 is an elevation of globe, support features, and stand parts. The globe (31) or globe and cloud hemispheres (32) sit on the support arm (80) or they may be suspended free of this arm through the use of the fixed mount (34) and adjustable mount (35). The support arm (80) in turn is free to be affixed to the support (37) by virture of a plurality of toothed surfaces. Thus the globe may be set to correspond to any seasonal inclination to the plane of the ecliptic. The remaining bracing support (36) keeps the globe (31) from rolling off its mountings and the stand upright.

FIGS. 11 through 16 pertain to the process of manufacturing the rigid globe sphere, preparing the globe to receive photographic information, developing that information, and finally preparing the exposed globe with trimming and assembly of additional feature elements. These figures may also be considered to describe a process for the preparation of two hemispheres rather than a single sphere for each Earth Photo Globe.

Figure 11:
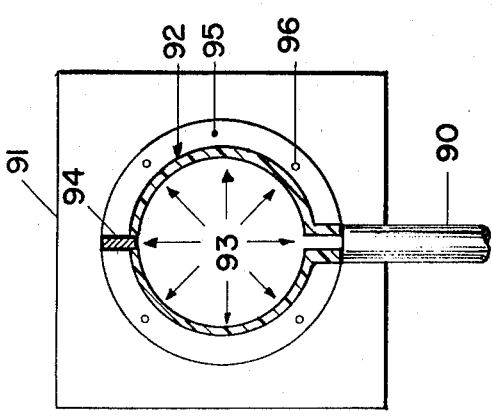
FIG. 11 is a diagrammatic view of a method for producing a rigid globe sphere using a plastic injection technique.

FIG. 11 indicates one process whereby the rigid globe sphere (or hemispheres) may be produced in large quantities. A thermoplastic is injected into a mold (91) and then forced against the walls of the mold by the introduction of a suitable pressurized atmosphere (93) through the nozzle (90) at the south pole of the ultimate globe. A plug is affixed to the north pole during this molding process to leave a hole. The flange of thermoplastic (95) is left to provide locating guides (96) for precise location of elements during subsequent processes.

Figure 12:
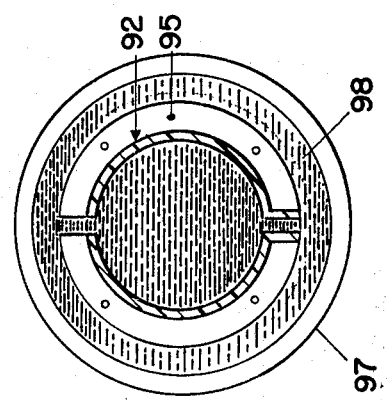
FIG. 12 is a transverse sectional view illustrating the coating of a globe sphere with a photopolymer.

FIG. 12 shows the thermoplastic sphere (or hemispheres (92)) with attached flange (95) immersed in a bath of photographic emulsion (98) or photopolymer held in a suitable container (97).

Figure 13:
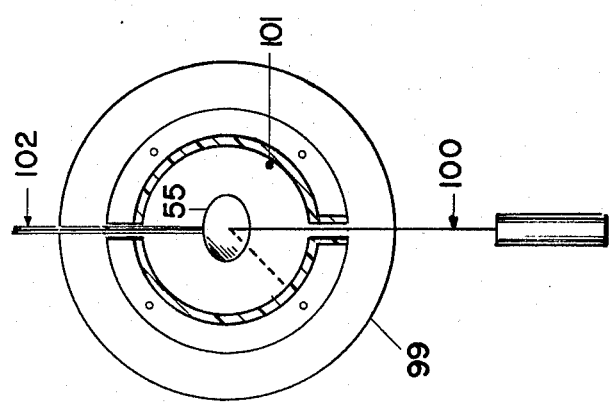
FIG. 13 is a diagrammatic view of one method of placing an image on a photosensitized globe sphere.

FIG. 13 shows the method for placing the image on the prepared sphere. The thermoplastic sphere or hemisphere (92) after being removed from the emulsion or photopolymer bath (98) (and having the surface which is not to be exposed cleansed of emulsion through a suitable washing process), is placed on a mounting stand (99), and a mirror (55) and a mirror mount (102) are inserted into the north pole hole left by the plug (94). The image light beam (100), photographic or laserlight, is directed onto the mirror (55) and reflected onto the emulsion or photopolymer (101). (NOTE: the process is described here as one that exposes the emulsion on the inside surface of the sphere. See FIG. 20 for a process whereby the emulsion may be placed on the exterior surface of the sphere (131)).

FIG. 14 shows the thermoplastic sphere (92) with an exposed emulson surface, placed in a developer bath (or baths) (104) held by a suitable container (103).

Figure 15:
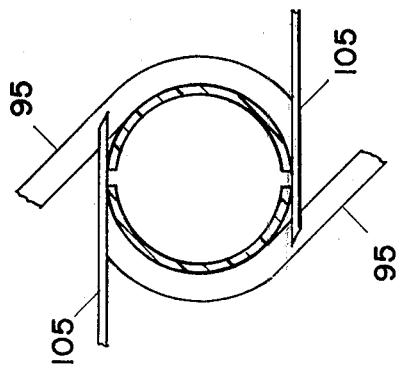
FIG. 15 is a diagrammatic view showing trimming away of the flanges from a globe made of two hemispheres each having such a flange.

FIG. 15 shows the trimming of the flange (95) with suitable knives (105). If the globe be made of two hemispheres, they would be attached using the locating guides (96) for exact alignment and sealed together before this trimming process takes place.

Figure 16:
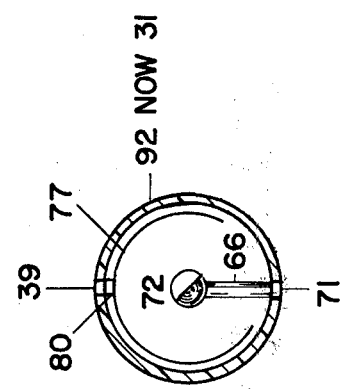
FIG. 16 is a transverse sectional view of another embodiment of the earth photo globe having an interior lighting element.

FIG. 16 shows the completely manufactured globe. The exposed glove (31) is provided with interior lighting element (72), spindle (66), and lighting control assembly (71), all of which are inserted through the south pole opening. The political information circuitry (77), gazette microprocessor (80), and north pole control assembly (39) are all inserted through the north pole opening.

Figure 17:
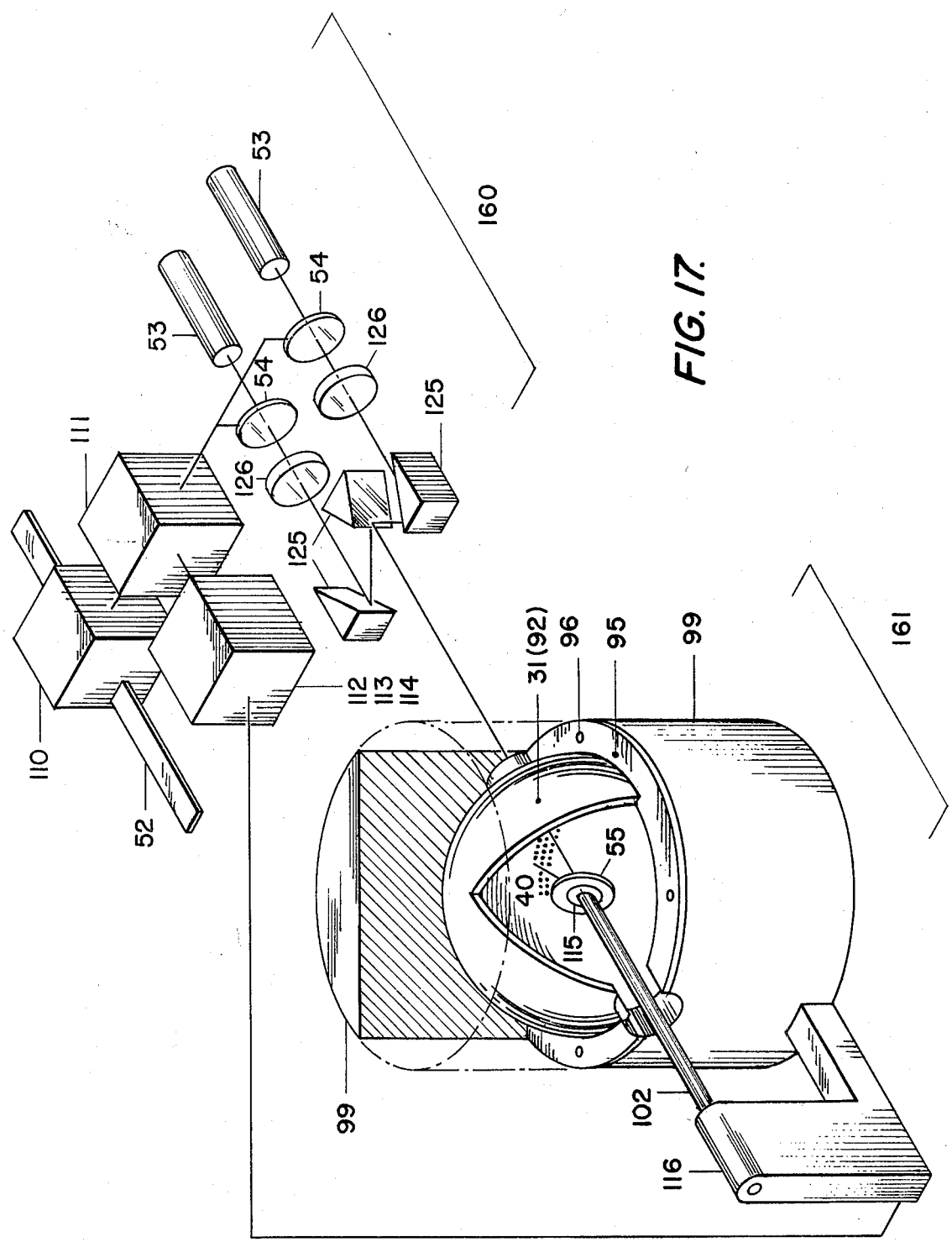
FIG. 17 is a pictorial, diagrammatic view of a method for making the inventive earth photo globe of FIG. 1 utilizing raster-type scanning of a laser beam across a photosensitized surface of a globe sphere.

FIG. 17 shows one process whereby digitized remotely sensed data from satellite or other source (52) may be accurately affixed to a surface. The particular process illustrated in this FIG. 17 makes use of a plurality of lasers as the light source, a plurality of acousto-optical modulators as the means of light value control, and an arrangement of mirrors, motors, and controls (similar to the kind used in Mead Laboratories Digital Laser Printer) for printing on the interior of the globe surface.

The input data (52) is processed and analyzed in the averager and digital overlap filter (110) and then stored in the globe output memory (111). This in turn controls the variable intensity of the plurality of acousto-optical modulators (54) and at the same time through the memory control (112), clock (113), and synchronizer (114), determines the position of the printing mirror (55) through the rotation sensor (115) and thus instructs and coordinates activity of both the mirror motor (116) and modulators (54). This assures that each light dot (40) will have the proper value at the proper location on the surface of the globe. The prepared globe shell (31) is placed on the lower part of the mounting stand (99) and held in place through the locating guides to allow the upper part of the mounting stand (99) to be lowered into place.

A plurality of lasers (53), each with a different spectral density characteristic (obtained by using a variety of types of lasers: ruby, helium, neon, argon, krypton, etc.) can provide a range of spectral intensity characteristics which will produce a sufficient variety of colors to produce a convincing color image of earth. The coherent laser light rays, modified by the modulators (54) and processed through appropriate collimating optics (126)

is reflected onto the center of the printing mirror (55) through an arrangement of mirrors and prisms (125).

Figure 18:
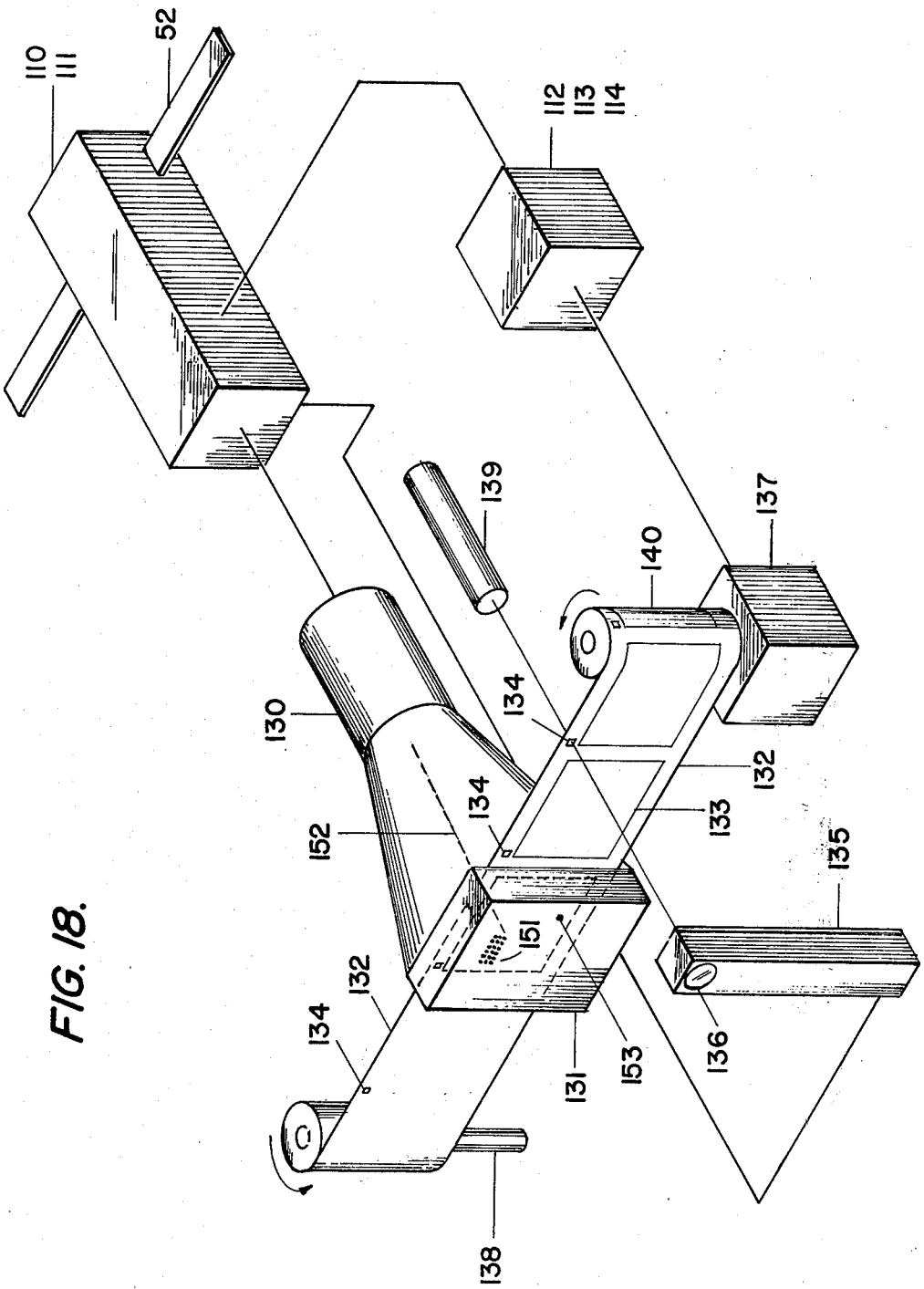
FIG. 18 is a pictorial diagrammatic view of a manner of preparing photographic negative images with geographical data, such images being useful for making an earth photo globe.
Figure 19:
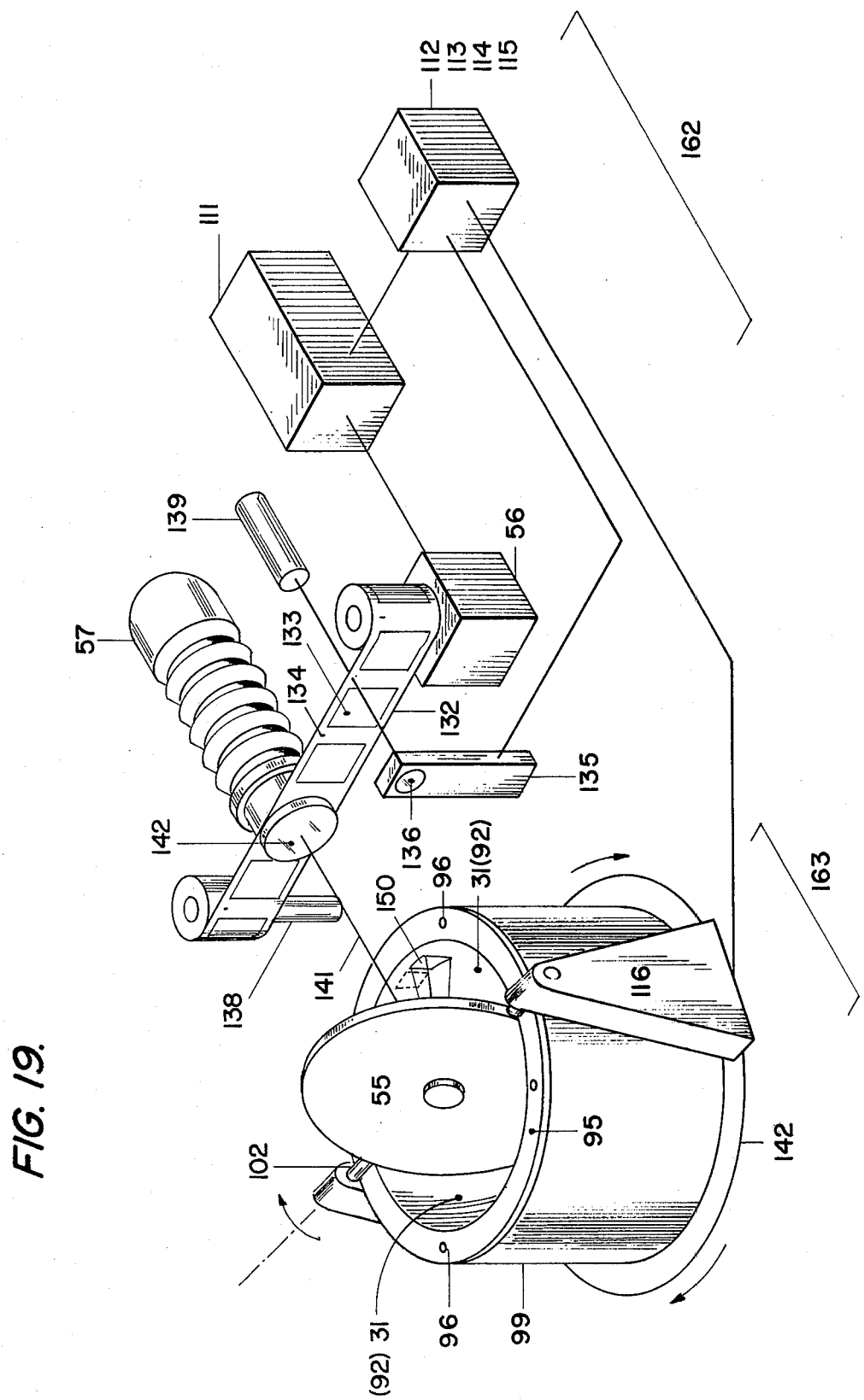
FIG. 19 is a pictorial diagrammatic view of another method for making the inventive earth photo globe using the images with geographical data prepared using the system shown in FIG. 18.

FIGS. 18 and 19 depict another method of affixing digital information acquired from LANDSAT or other equivalent data onto a globe surface to make a visual image of earth. This method relies on the preparation of a film negative (132) composed of negative-image frames (133) of film dots (151) which are projected as a group onto the globe surface, in the form of sequential frames (150).

FIG. 18 shows a method for affixing the data (52) onto such a geographic film negative (132) as a series of sequential frames (133) of film dots (151). The unexposed film (132) is positioned in a vacuum sealed chamber (131) and exposed to a cathode ray beam (152) generated in a cathode ray tube (130). The Dicomed Corporation's D-48 CRT is an example of such an apparatus already commercially available. This method generates a film negative image frame (133) composed of film dots (151), whose values and locations are determined by the averager and digital overlap filter (110) and globe output memory (111). An algorithm for geometric distortion from sphere to flat image may not be necessary, as the distorted flat image will be projected ultimately onto a sphere again, but if such algorithm be desirable, they would be part of the software of the averager or digital overlap filter (110). The necessary position for the film to correctly correspond to the proper globe address is achieved through the use of memory access control (112), clock (113), synchronizer (114) and rotation sensor (115). These in turn instruct the film drive mechanism (137) which in turn moves the film take-up spindle (140), and thus advances the film (132). Precise alignment of film frame location is obtained with a laser (139) which directs a ray through the film (132) to a measuring photocell (136). The time and position of the ray is processed by a film sequence locator (135) which feeds this information back to be stored in the globe output memory (111). The film locator mark (134) corresponds to the frame being developed at that time (152) although it does not necessarily need to be immediately adjacent to the frame. Additional film is stored on the film supply spindle (138).

FIG. 19 shows a method for affixing the images of the geographic film negative (132) onto accurate location (150) on a photosensitized hemispherical surface (92). This method has the advantage of being able to place many dots (40) onto the globe surface at one time, thereby reducing the time and energy and data storage required to produce multiple copies of the globe. The globe output memory (111) instructs the film negative drive system (56) to advance and position the proper negative image from (133) between the photographic printing system light source (57) and focusing optics (142). Precise alignment of film negative image (133) and globe image location (150) is obtained through a laser (139) which notes the appropriate film locator mark (134) and indicates it on the measuring photocell (136). The film sequence locator (135) relays this information to the memory access control (112), clock (113), synchronizer (114), rotation sensor (115) system, which in turn instructs the printing mirror drive motor (116) to its correct position and angle. The position of the motor (116) may be changed by moving the motor (116) on the circular track (142) provided, with appropriate wormgear drive (not shown). The printing mirror (55) is attached to the drive motor (116) by means of a support axle (102) which allowsl the mirror to be tilted and rotated to the appropriate angle.

The photosensitized hemispherical surface (92) is positioned precisely on the mounting stand (99) by using the locating guides (96) which are located in the flange (95). The mirror (55) and motor (116) assembly may be moved out of the way to permit removal of the completely exposed hemisphere.

NOTE: The laser image generating assembly (160) may also be used in conjunction with the hemisphere printing assembly (163), and the photographic film image generating assembly (162) may be used in conjunction with the sphere printing assembly (161). Thus four methods of converting digital data into a visual spherical image are herein described.

Figure 20:
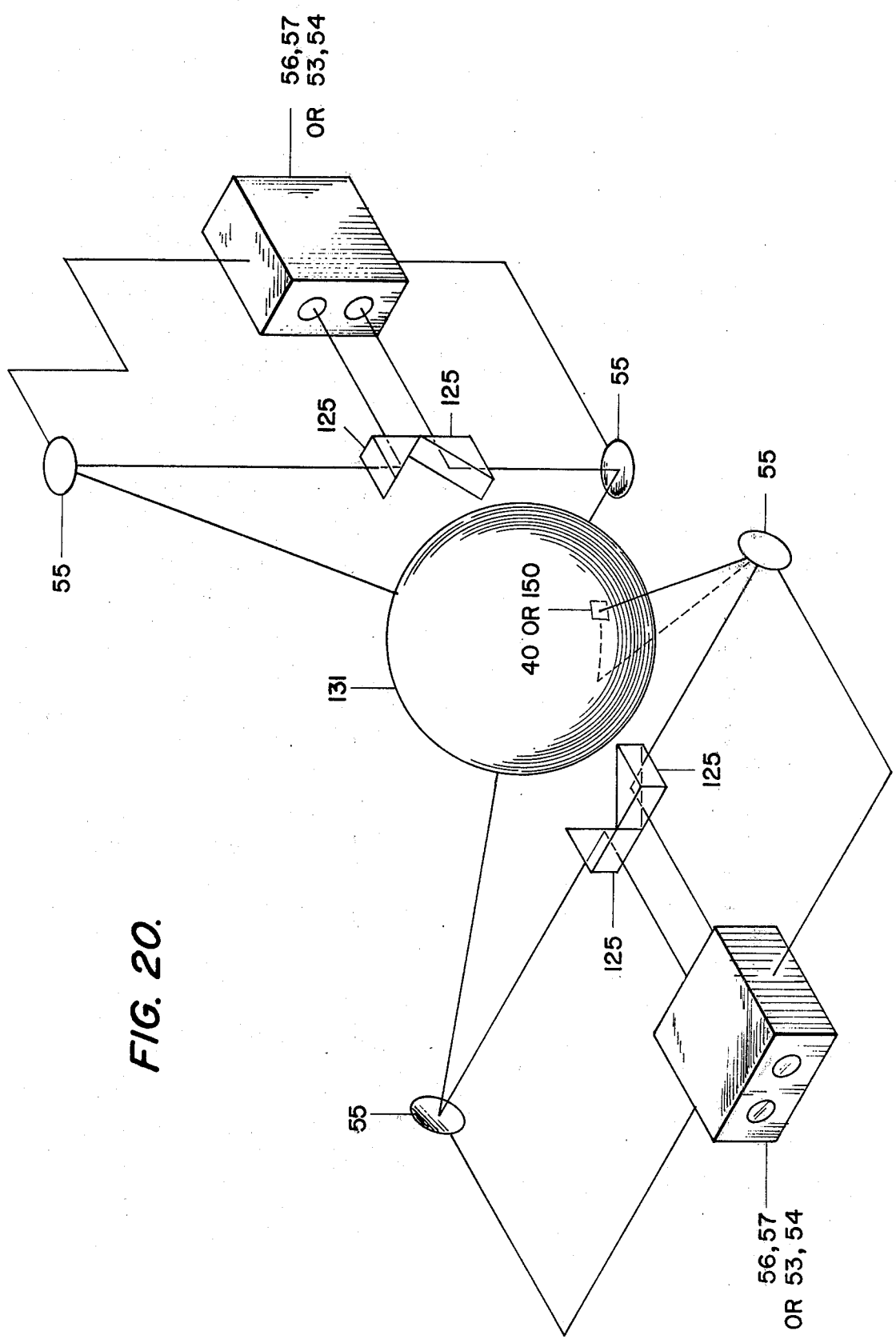
FIG. 20 is a pictorial diagrammatic view of yet another way of making the inventive earth photo globe.

FIG. 20 shows a method for placing visual information onto the exterior surface of a sphere (131). An array of at least four printing mirrors (55) are coordinated as described elsewhere in this document (FIGS. 2, 17, 18, and 19) with a plurality of light sources (53 or 57) and data source (111) to ensure that the image on the surface of the sphere (40 and/or 150) is the proper value at the proper location. The light beams are directed to the printing mirrors (55) by means of appropriately placed mirrors and prisms (125). NOTE: this method may also be used to simultaneously print two hemispheres instead of one single sphere.

Figure 21:
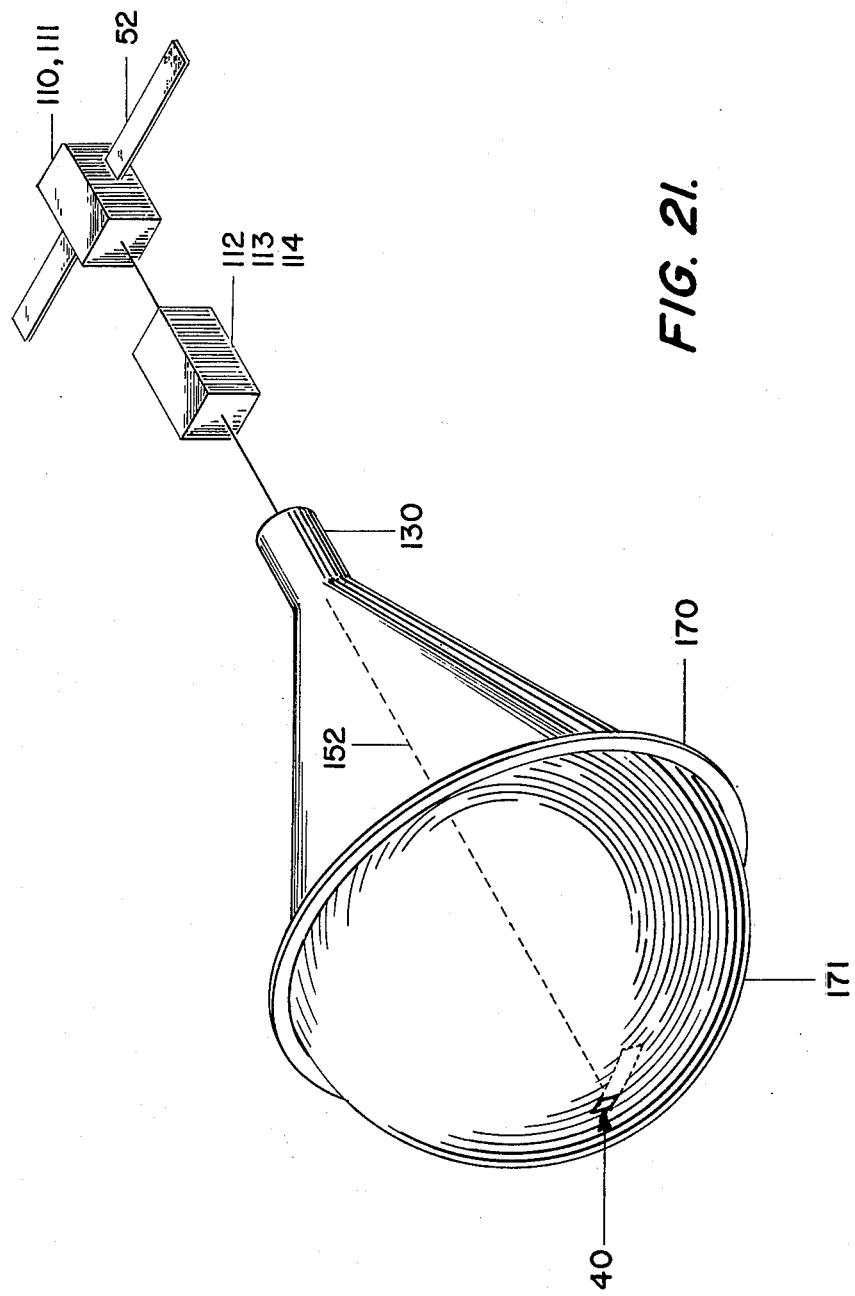
FIG. 21 is a pictorial diagram showing another method of directly placing LANDSAT or other remote sensing geographical data onto a hemisphere.

FIG. 21 shows a method of directly placing LANDSAT or other data (52) onto a hemisphere (171) which combined with cathode ray gun (130) effectively becomes a television with a hemispherical picture surface. Since it is impossible for an individual to see more than half of a sphere at one time, for some applications this may be the most effective way of presenting certain information, especially information of more than one dimension, for instance a combined readout crop yield and cloud formation, or population as a function of changing political boundaries. The raw data (52) is processed as described elsewhere in this document, emerges as a controlled electron beam (152) and is seen as a pixel (40) on the hemispherical screen.

As a further application of the use of the globe memory storage (111), this information may be made available in electronic form and broadcast to vessels and vehicle over a regular radio or TV broadcase frequency (AM, FM, CB, UHF, VHF, etc.). Transportation carriers could thus tune in the local map which could be displayed as a continuously changing image on a small TV screen. If the carrier could signal its position to a navigational satellite system, is location could be processed in real time, added to the globe data input, and be displayed on the TV map image. Levels of magnification to the limits of current remotely sensed data accuracy and even better are possible through this process by simply increasing the memory capacity and adding a magnification and scale factor to the software.

I claim:

1. A method of making a globe in which geographical indicia comprise quantized image dots disposed on the surface of a sphere, comprising:

storing in a memory data representing said quantized image dots, providing a photosensitively coated sphere, scanning a light beam across said photosensitively coated sphere, obtaining from said memory data representative of the quantized image dot desired at each location scanned by said light beam, and modulating said light beam in accordance with said obtained data so as to control the exposure of said photosensitive coating to produce quantized image dots corresponding to said memory data.

2. A method according to claim 1, wherein said stored data represent the intensity and/or color of the corresponding quantized image dots, said stored data being obtained from LANDSAT or other remote sensing systems, the definition of said quantized image dots being smaller than that resolvable by the unaided human eye.

3. A method according to claim 2 wherein said light beam is supplied by a plurality of lasers of mutually different wavelength, and wherein said modulating controls the relative intensities of the light from said plural lasers so as to modulate both the intensity and color of the light beam to which said coated sphere is exposed.

4. A method according to claim 1 wherein said light beam is a laser beam and wherein said scanning is carried out so as to raster scan the entire spherical surface of said globe.

5. A method according to claim 4 wherein said scanning is carried out by separately, concurrently raster scanning mutually different sectors of said sphere.

6. A method according to claim 4 wherein said providing comprises placing said photosensitive coating on the inside of said sphere, and wherein said scanning includes:

situating a rotating tiltable mirror within said sphere adjacent the center thereof, directing said laser beam to the surface of said sphere via said mirror, controlling the rotation and tilting of said mirror to produce a raster scan of the entire inside spherical surface of said sphere, sensing the rotational and tilt orientation of said mirror during said raster scan, and utilizing said sensed orientation to control the obtaining from memory of said data and the modulating of said light beam with said obtained data.

7. A method according to claim 1 wherein said providing comprises:

making a plastic sphere having an exterior outwardly protruding peripheral flange, immersing said sphere in a bath of photographic emulsion, and utilizing said flange to mount and orient said sphere during said scanning.

8. A method according to claim 7 wherein said making comprises:

injecting thermoplastic into a spherical or hemispherical mold, and forcing said injected thermoplastic against the wall of said mold by the introduction of a pressurized atmosphere through a nozzle situated at the position of a pole of the ultimate globe.

9. A method according to claim 7 wherein said step of making includes separately making two hemispheres each having a peripherical flange, and including the steps of utilizing said flanges to align said two hemispheres during attachment thereof to form said sphere, and thereafter triming away the flanges.

10. A globe made by the method of claim 7.

* * * * *